United States Patent
Sidoti et al.

[11] Patent Number: 5,982,845
[45] Date of Patent: Nov. 9, 1999

[54] FORWARD PROJECTION AND BACKPROJECTION PROCESSOR

[75] Inventors: John Sidoti, Parma; Holly F. Heiple, Chagrin Falls; Anthony F. Krecic, Euclid; Robert J. Merat, Mentor, all of Ohio

[73] Assignee: Picker International, Inc., HIghland Heights, Ohio

[21] Appl. No.: 09/056,563

[22] Filed: Apr. 7, 1998

[51] Int. Cl.$^6$ .................................................. A61B 6/03
[52] U.S. Cl. ................................................. 378/4; 378/901
[58] Field of Search ......................... 378/4, 901; 382/131

[56] References Cited

U.S. PATENT DOCUMENTS 5,008,822   4/1991   Brunnett et al. .................... 600/425
5,821,541  10/1998   Tumer ................................. 250/370.09

*Primary Examiner*—David Vernon Bruce
*Attorney, Agent, or Firm*—Fay, sharpe, Beall, Fagan, Minnich & McKee

[57] ABSTRACT

A forward projector/backprojector (30) for a CT scanner (10) includes a VME interface (36) which loads data onto and off of the forward projector/backprojector (30), and a CPU (42) which controls data flow. An array of ASICs (60a-x) is included. Each ASIC has two pipelines along which data is subjected to pipeline operations including one of a forward projection algorithm and a backprojection algorithm. Double-buffered memories for storing data subject to the pipeline operations are arranged on each ASIC (60a-x) such that while data is loaded into one bank of the double-buffered memories data in its opposing bank is subject to pipeline operations. A dual in-line memory module (DIMM) daughtercard (120) holds an output memory (100) with two banks employed during pipeline operations. For consecutive pipeline operations the two output memory banks are alternatingly employed with one of the two output memory banks having previously written results read therefrom for updating by the pipeline operations and the other of the two output memory banks having updated pipeline results written thereto. The DIMM daughtercard (120) also holds an output buffer memory (110) which stores final updated pipeline results after completion of consecutive pipeline operations. A peripheral component interconnect (PCI) bus (50) transfers data between the CPU (42), the VME interface (36), the DIMM daughtercard (120), and the array of ASICs (60a-x).

18 Claims, 3 Drawing Sheets

FORWARD PROJECTION AND BACKPROJECTION PROCESSOR

BACKGROUND OF THE INVENTION

The present invention relates to the diagnostic imaging arts. It finds particular application in conjunction with CT scanners and will be described with particular reference thereto. However, it is to be appreciated that the present invention is also amenable to other like applications where quality high speed forward projection and backprojection of data is desired (e.g. magnetic resonance and proton emission).

Generally, CT scanners have a defined examination region or scan circle in which a patient or other subject being imaged is disposed. A beam of radiation is transmitted across the examination region from an x-ray source to oppositely disposed radiation detectors. The segment of the beam impinging on a sampled detector defines a ray extending from the source to the sampled detector. The source, or beam of radiation, is rotated around the examination region such that data from a multiplicity of rays crisscrossing the examination region are collected.

The sampled data is typically convolved and backprojected into an image memory commonly described as a two-dimensional array of memory elements. Each memory element stores a CT number indicative of the transmission or attenuation of the rays attributable to a corresponding incremental element within the examination region. The data from each ray which crossed the incremental element of the examination region contributed to the corresponding CT number, i.e., the CT number for each memory element of the resultant image is the sum of contributions from the multiplicity of rays which passed through the corresponding incremental element of the examination region.

Commonly, the x-ray data is transformed into the image representation utilizing filtered backprojection. A family of rays is assembled into a view. Each view is filtered or convolved with a filter function and backprojected into an image memory. Various view geometries have been utilized in this process. In one example, each view is composed of the data corresponding to rays passing parallel to each other through the examination region, such as from a traverse and rotate-type scanner. In a rotating fan beam type scanner in which both the source and detectors rotate, each view is made up of concurrent samplings of the detectors which span the x-ray beam when the x-ray source is in a given position, i.e., a source fan view. The detectors commonly have either an equal linear spacing or an equal annular. Alternately, with stationary detectors and a rotating source, a detector fan view is formed from the rays received by a single detector as the x-ray source passes behind the examination region opposite the detector.

In forward projection, the image data is processed to synthesis each of the multiplicity of views that went through convolution and backprojection to make the image representation.

Various backprojection and forward projection algorithms have been developed. For CT scanners, it is generally advantageous to have a substantially instantaneous display of the resultant CT images. The many millions of computations required renders general purpose computers inappropriately slow for backprojection. As well, various forward projection software routines have been written for general purpose microcomputers. Again, however, the task of breaking the image representations apart into their component views requires many millions of computations. The execution time for such programs, commonly on the order of many minutes to hours, rendered forward projection too slow for many everyday clinical applications.

To obtain the image representations rapidly, the projections are normally performed with dedicated projection hardware. One such forward projection/backprojection processor for CT scanners is described in U.S. Pat. No. 5,008,822 to Brunnett, et al. incorporated herein by reference. However, certain limitations of the described forward projection/backprojection processor regarding speed, efficiency, space consumption, and the like, make it inappropriate for certain applications.

The present invention contemplates a new and improved forward projection/backprojection processor which overcomes the above-referenced problems and others.

SUMMARY OF THE INVENTION

In accordance with one aspect of the present invention, a forward projector/backprojector for a CT scanner is provided. It includes a first interface which loads data onto and off of the forward projector/backprojector. A central processing unit controls data flow. An array of application specific integrated circuits are included. Each application specific integrated circuit includes two pipelines along which data is subjected to pipeline operations including one of a forward projection algorithm and a backprojection algorithm. The application specific integrated circuits also include double-buffered memories having opposing sets of banks for storing data subject to the pipeline operations. The double-buffered memories are arranged such that while data is loaded into a set of banks of the double-buffered memories, data in its opposing set of banks is subject to pipeline operations. A dual in-line memory module daughtercard is included. It contains two output memory banks employed during pipeline operations. For consecutive pipeline operations, the two output memory banks are alternatingly employed such that one of the two output memory banks has previously written results read therefrom for updating by the pipeline operations while the other of the two output memory banks has updated pipeline results written thereto. The dual in-line memory module daughtercard also includes an output buffer memory bank which stores final updated pipeline results after completion of consecutive pipeline operations. A peripheral component interconnect bus is employed in transferring data between the central processing unit, the first interface, the dual in-line memory module daughtercard, and the array of application specific intergrated circuits.

In accordance with a more limited aspect of the present invention, the double-buffered memories of the application specific integrated circuits are automatically toggled such that on consecutive pipeline cycles each set of banks of the double-buffered memories is alternately loaded and subject to pipeline operations.

In accordance with a more limited aspect of the present invention, each application specific integrated circuit automatically directs data being loaded, to the double-buffered memories set of banks which is designated for loading regardless of which set of banks is addressed.

In accordance with a more limited aspect of the present invention, each application specific integrated circuit further includes a selectively enabled circuit for performing a cubic spline interpolation of input data prior to loading into one of the double-buffered memories.

In accordance with a more limited aspect of the present invention, each application specific integrated circuit further includes a table memory which stores look-up tables having transformation data used in the pipeline operations, wherein the transformation data from the look-up tables is arranged such that it is linearly interpolated during pipeline operations.

In accordance with a more limited aspect of the present invention, the table memory of each application specific integrated circuit further includes an overall range of addressable locations. The overall range of addressable locations includes a predefined range of valid address locations. The table memory is arranged such that addressing an addressable location of the overall range of addressable locations outside the predefined range of valid address locations returns a zero value.

In accordance with a more limited aspect of the present invention, each application specific integrated circuit further includes address rounding circuitry which rounds all fractional address values toward a closet integer value in one of a positive infinity direction and a negative infinity direction. Also included is data value rounding circuitry which rounds positive fractional data values that are equidistant from two integer values toward positive infinity, negative fractional data values that are equidistant from two integer values toward negative infinity, and all other fractional data values toward a closest integer value.

In accordance with a more limited aspect of the present invention, a method of forward projection/backprojection is provided. The method includes loading data onto a projection processor and directing data flow on the projection processor over a bus. Data is successively loaded from the bus into an array of application specific integrated circuits while concurrently performing successive pipeline operations. Pipeline operations include one of a forward projection and a backprojection with data previously loaded into the array of application specific integrated circuits. The results of the pipeline operations are accumulated and consecutively updated.

In accordance with a more limited aspect of the present invention, the method includes storing a final result from the pipeline operations separately from accumulated results and accessing the final results without interrupting the updating of the accumulated results.

In accordance with a more limited aspect of the present invention, the method includes selectively subjecting at least a portion of the data to a cubic spline interpolation as the data from the bus is being loaded into the array of application specific integrated circuits.

In accordance with a more limited aspect of the present invention, the method includes generating address and data values while performing successive pipeline operations. All fractional address values are rounded toward a closest integer value in one of a positive infinity direction and a negative infinity direction. For data values, rounding involves rounding positive fractional data values that are equidistant from two integer values toward positive infinity, negative fractional data values that are equidistant from two integer values toward negative infinity, and all other fractional data values toward a closest integer value.

In accordance with a more limited aspect of the present invention, the method includes retrieving previously stored accumulated results from one of two memory banks. The previously stored accumulated results are combined with current accumulated results. Then the combination is stored in one of the two memory banks not used for retrieving the previously stored accumulated results from. The one of the two memory banks of memory which is used for retrieving previously stored accumulated results from is alternated.

In accordance with a more limited aspect of the present invention, the method includes generating look-up tables via linear interpolation of table memories while performing successive pipeline operations. At least one of the look-up tables is arranged with an overall range of addresses at least twice the size of a predefined range of valid addresses. Values corresponding to addresses in the overall range of addresses that are outside the predefined range of addresses are set to zero.

In accordance with a more limited aspect of the present invention, a forward projection/backprojection processor is provided in a CT scanner. The CT scanner includes a stationary gantry portion which defines an examination region, a rotating gantry portion mounted on the stationary gantry portion for rotation about the examination region, an x-ray source arranged on the rotating gantry portion such that a beam of radiation passes through the examination region as the rotating gantry portion rotates, a collimator and shutter assembly for forming the beam of radiation into a thin fan-shaped beam and selectively gating the beam on and off, an array of radiation detectors arranged to receive the x-ray radiation emitted from the x-ray source after it has traversed the examination region, an array processor for filtering and convolving sampled data from detectors, and a human viewable display for displaying view data from forward projection operations and reconstructed images from backprojection operations. The forward projection/backprojection processor includes a first interface which loads input data from the array processor into the forward projection/backprojection processor and passes output data from the forward projection/backprojection processor to the human viewable display. A central processing unit controls data flow. An array of application specific integrated circuits is provided. Each application specific integrated circuit has two pipelines along which data is subjected to pipeline operations including one of a forward projection algorithm and a backprojection algorithm. The application specific integrated circuits also include double-buffered memories having opposing sets of banks for storing data subject to the pipeline operations. The double-buffered memories are arranged such that while data is loaded into a set of banks of the double-buffered memories, data in its opposing set of banks is subject to pipeline operations. Two output memory banks are employed during pipeline operations. For consecutive pipeline operations, the two output memory banks are alternatingly employed such that one of the two output memory banks has previously written results read therefrom for updating by the pipeline operations while the other of the two output memory banks has updated pipeline results written thereto. An output-buffer memory bank stores final updated results after completion of consecutive pipeline operations.

One advantage of the present invention is that is provides high quality forward projection/backprojection processing.

Another advantage of the present invention is its compact configuration.

Another advantage of the present invention is its high processing speed.

Another advantage of the present invention is its relatively low production cost.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
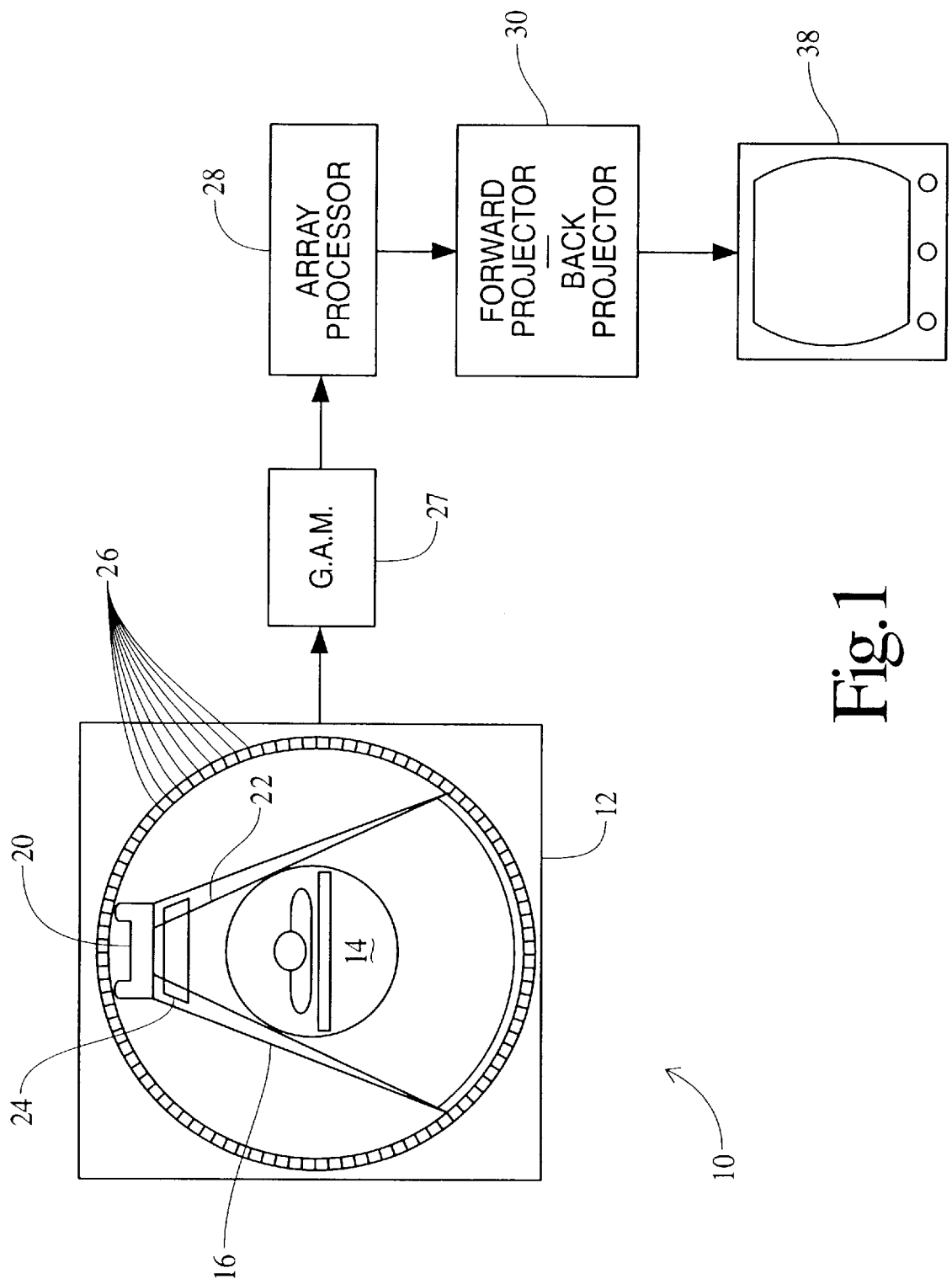
FIG. 1 is a diagrammatic illustration of a CT scanner in accordance with aspects of the present invention.

With reference to FIG. 1, a CT scanner 10 includes a stationary gantry portion 12 which defines an examination region 14. A rotating gantry portion 16 is mounted on the stationary gantry portion 12 for rotation about the examination region 14. An x-ray source 20, such as an x-ray tube, is arranged on the rotating gantry portion 16 such that a beam of radiation 22 passes through the examination region 14 as the rotating gantry portion 16 rotates. A collimator and shutter assembly 24 forms the beam of radiation 22 into a thin fan-shaped beam and selectively gates the beam 22 on and off. Alternately, the fan-shaped radiation beam 22 may also be gated on and off electronically at the x-ray source 20.

In the illustrated fourth generation CT scanner, a ring of radiation detectors 26 are mounted peripherally around the examination region 14 on the stationary gantry portion 12. Alternately, the radiation detectors 26 may be mounted on the rotating gantry portion 16 on a side of the examination region 14 opposite the x-ray source 20 such that they span the arc defined by the fan-shaped x-ray beam 22. Regardless of the configuration, the radiation detectors 26 are arranged to receive the x-ray radiation emitted from the x-ray source 20 after it has traversed the examination region 14.

In a source fan geometry, an arc of detectors which span the radiation emanating from the source are sampled concurrently at short time intervals as the x-ray source 20 rotates behind the examination region 14 to generate a source fan view. In a detector f an geometry, each detector is sampled a multiplicity of times as the x-ray source 20 rotates behind the examination region 14 to generate a detector fan view. The path between the x-ray source 20 and each of the radiation detectors 26 is denoted as a ray.

The radiation detectors 26 convert the detected radiation into electronic data. That is to say, each of the radiation detectors produces an output signal which is proportional to an intensity of received radiation. Optionally, a reference detector may detect radiation which has not traversed the examination region 14. A difference between the magnitude of radiation received by the reference detector and each radiation detector 26 provides an indication of the amount of radiation attenuation along a corresponding ray of a sampled fan of radiation.

In the illustrated fourth generation scanner embodiment, each view or data line represents a fan of rays having its apex at one of the radiation detectors 26 collected over a short period of time as the x-ray source 20 rotates behind the examination region 14 from the detector. In a third generation scanner, each view or data line represents a fan of rays having an apex at the x-ray source 20 collected by concurrent sampling of all detectors.

A gantry acquisition memory board 27 receives sampled data from the radiation detectors 26. The gantry acquisition memory board 27 shuffles the data to transform it from a detector fan geometry to a source fan geometry and performs a ripple filtering operation before passing the data to an array processor 28. The array processor 28 processes the view data from the gantry acquisition board 27 and loads it onto the forward projector/backprojector 30. The array processor performs mathematical manipulations which convolve each view with an appropriate filter or convolution function for the view format.

Figure 2:
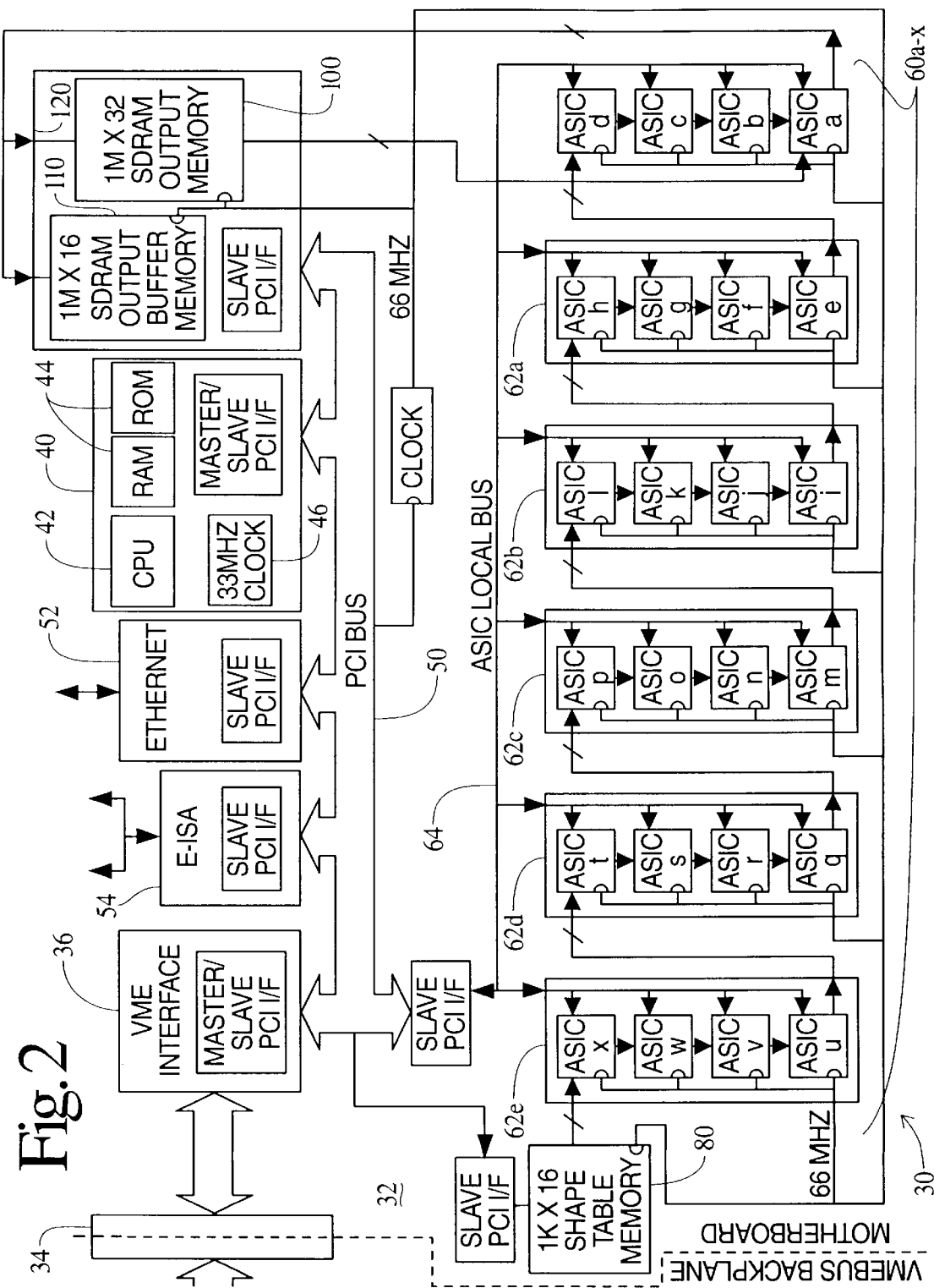
FIG. 2 is a diagrammatic illustration of a forward projector/backprojector in accordance with aspects of the present invention; and, FIG. 3 is a diagrammatic illustration of an application specific integrated circuit in accordance with aspects of the present invention.

With reference to FIG. 2 and continuing reference to FIG. 1, the forward projector/backprojector 30 is contained on a printed circuit board (PCB), hereinafter referred to as the projector board or motherboard 32. The projector board 32 is provided with a versa module eurocard (VME) connector 34 along the backplane and VME interface 36 (or other appropriate interface) which takes data, including data from the array processor 28, on and off the projector board 32. Output data is also passed via the VME interface 36 to a display system 38 including a human viewable display (such as a video monitor), storage devices, and the like. The VME interface 36 allows communication with outside system components. The projector board 32 also contains a CPU daughterboard 40 for controlling the projector board 32 and directing data flow that includes a central processing unit (CPU) 42, RAM and ROM memories 44, and a 33 MHz clock 46 which is ramped to 66 MHz for clocking the appropriate hardware.

The CPU daughterboard 40 communicates with the rest of the projector board hardware via a local peripheral component interconnect (PCI) bus 50. Over the PCI 50, the CPU 42 communicates with an ethernet port 52 or other like network connection, the VME interface 36, and projection specific hardware. The projection specific hardware included an array of application specific integrated circuits (ASICS), and a dual in-line memory module (DIMM), both described in detail later herein. An included PCI mezzanine card (PMC) connector (not shown) provides for additional expandability. Also on the PCI bus 50 is an enhanced-industry standard architecture (E-ISA) interface 54 that provides two serial ports and a parallel port.

The local PCI bus 50 is used to transfer data between the CPU daughterboard 40, the VME interface 36, the E-ISA bus 54, the ethernet port 52, and the projection specific hardware. The CPU daughterboard 40 and the VME device 36 are the PCI bus masters and slaves while the other listed devices are PCI bus slaves. The PCI bus masters are the devices that can initiate a PCI bus cycle. The slave devices respond to an initiated PCI bus cycle.

The E-ISA bus 54 serves as a secondary bus on which to place miscellaneous components and/or devices such as: serial ports, a parallel port, a real time clock, non-volatile RAM, a reconstruction mother board control register—7 segment display register, a reconstruction mother board status register, and the like. The E-ISA 54 also provides a connection for a terminal through which to run diagnostic system checks, monitor system performance, and the like.

The projector 30 performs back and/or forward projection operations. Each of the operations occurs using pipelines contained in an array of application specific integrated circuits (ASICS) 60a–x. There are two pipelines per ASIC and up to 24 ASICS, or 48 pipelines, that can be incrementally configured to reduce the reconstruction time required by the projection board 32. A minimum configuration is eight pipelines, represented by ASICs 60a–d, all located directly on the projection board 32. The number of pipelines is optionally increase beyond eight in increments of eight pipelines, up to 48 total. The first eight pipelines, located directly on the projection board 32, are populated before any further pipelines are added. All pipelines after the first eight are located on daughterboards 62a–e that each contain eight pipelines, or four ASICS. Since one ASIC feeds data into an adjacent ASIC, the ASICs are placed in a set order. The eight minimum pipelines (represented by ACISs 60a–d) are populated first and feed the output memory (described later herein). Additional ASIC daughterboards 62a–e are added in a predetermined order to improve processing.

Figure 3:
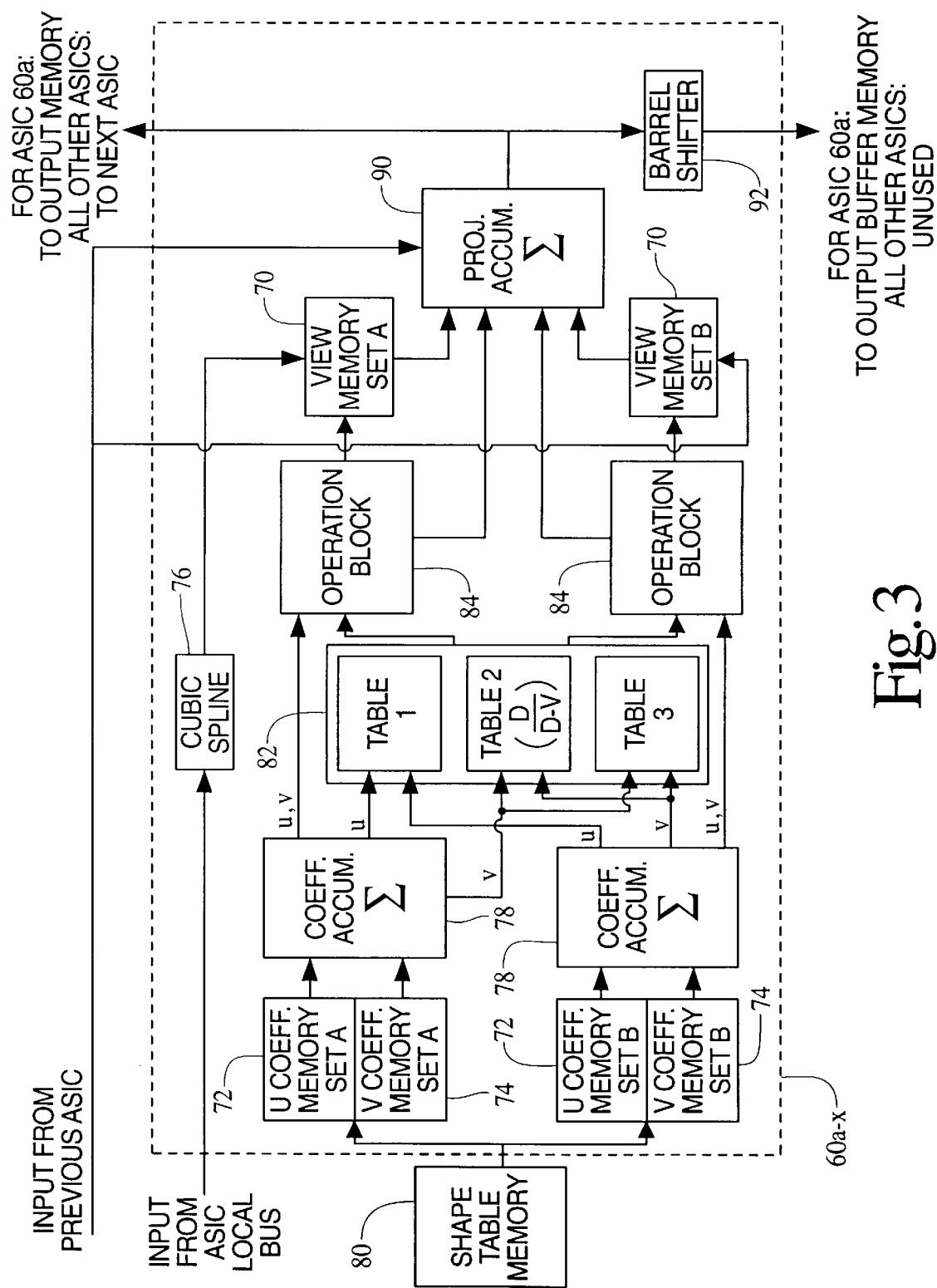

With reference to FIG. 3 and continuing reference to FIGS. 1 and 2, the array of ASICs 60a–x is loaded with data via an ASIC local bus 64 that connects with the PCI bus 50. Each of the ASICs 60a–x contain several memories, namely a view memory 70, and u and v coefficient memories 72 and 74 respectively (described later herein) that are loaded with the appropriate data prior to starting a projection or pipeline operation. These loaded memories are doubled-buffered, allowing the system to write data to the unused set of duplicate memory while a pipeline operation is being executed with the other set. In this manner, the memory load operations are hidden while pipeline cycles are being executed, thus reducing the overall time it take to complete the entire projection operation. That is, the memory loading and pipeline operations are performed simultaneously.

As stated earlier, each ASIC 60a–x has two pipelines and the double-buffered memories consist of two sets of duplicate memories one each alternately used by the two pipelines. Nominally, these sets are termed set A and set B. The memory set accessed for loading is selectively determined in one of two ways. In a manual mode, both sets of memories can be addressed. However, access cannot be completed if (when in manual mode) the memory set addressed is being used for a projection operation. The ASIC will not complete the data transfer even though the PCI access will complete. Under these circumstances, an interrupt is transmitted to the CPU 42, such as a bus error condition. In the manual mode, after each pipeline operation is completed with one set of memories and the other set has been loaded, the memory sets are toggled manually. On the other hand, in an automatic mode, the set of memory that is accessed for loading and that which is used for pipeline operations is controlled automatically. For example, the first set of memory that is automatically selected for pipeline operations is set B. enabling set A to be accessed via the PCI interface 50 and ASIC local bus 64 for loading data. In the automatic mode, the set of memory that is enabled for loading can be accessed using the double-buffered addresses of either memory set. The ASIC directs any access to the enabled memory not occupied with pipeline operations regardless of which address range is actually selected. Moreover, the memory set enabled will automatically toggle each time a pipeline operation is started.

The double-buffered view memory 70 is loaded with view data used for backprojection. Alternately, for forward projection, it is loaded image pixel line data. Each ASIC includes cubic spline interpolation circuitry 76. The data set that is loaded into the view memories 70 is interpolated using the cubic spline 76 to achieve better resolution. Applying cubic spline interpolation to the data results in twice as much data being generated, i.e. the original number of data points plus an equal number of interpolated data points. Both values are written into view memory 70. Cubic spline interpolation is performed as the data is being written into the view memories 70 via the PCI bus 50 and the ASIC local bus 64. Optionally, the cubic spline interpolator 76 may be disabled.

The cubic spline interpolation takes into consideration four adjacent data points about the interpolated point being generated. Therefore, the cubic spline interpolation accounts for varying slopes associated with the data and improves the accuracy of the point being generated as compared to linear interpolation. The cubic spline interpolation equation implemented is as follows:

$$D[int] = \frac{9(D[i+1] + D[i]) - (D[i+2] + D[i-1])}{16},$$

where D[int] is the cubic spline interpolated data point being generated, D[i] is the ith loaded data point, D[i-n] is the nth point preceding the ith data point, and D[i+n] is the nth point following the ith data point. Since the first input data point has none to the right, the first value is duplicated and appears in D[i] and D[i-1]. Likewise, for the last two cubic spline interpolated data points, the last input value is duplicated until all cubic spline interpolated data points are generated. Additionally, the data stored in the view memory 70 is selectively further expanded or linearly interpolated during projection or pipeline operations.

The values $U_0$, dUx, dUy, and –dUx are the u coefficients and the values $V_0$, dVx, dVy, and –dVx are the v coefficients. In backprojection, each view has a unique set of u and v coefficients that are based upon the geometric position of the detector 26 represented by the view data. The u and v coefficient memories 72, 74, each consisting of a 4×32 bit double-buffered memory, are loaded with the u and v coefficients corresponding to the view data loaded in the view memory 70. Alternately, for forward projection, these memories are loaded with coefficients corresponding to the image pixel line data loaded in the view memory 70. In operation, the u and v coefficient memory outputs are accumulated in coefficient accumulators 78.

A shape table memory 80 is used to specify a two-bit address of the u and v coefficient memories 72, 74 used during the projection process. The shape table memory 80 is an area of memory external to the ASICs 60a–x that is loaded before a projection is performed. The shape table data is applied to the u and v coefficient memories 72, 74 during a projection operation. Each 16-bit shape table memory location is programmed with information about each unique row of the image, including the number of pixels in each row. This allows each row of the image to be a unique length, thus, allowing an for an arbitrary image shape. For example, a square image would be programed so that the pixel count for each row is the same.

A backprojection pipeline operation generates an image from loaded view data in the view memories 70. It performs a geometrical transformation from u,v coordinates to x,y coordinates of image space. The x,y coordinate space is constant throughout the backprojection process. The u,v coordinate space is unique for each view associated with each detector 26. During backprojection, the u and v coefficient memories 72, 74 are used to transform from the u,v coordinate space into the output image's x,y coordinate space. The shape table memory 80 is used to determine how many pixels are in a line or row of the image and where a start point for each line is located in the x,y image field. The u and v coefficient memories 72, 74 provide the geometric parameters that allow the current view's u,v space to be mapped into the x,y image space. The transformation process for each view takes place by supplying the initial u and v coordinates $U_0,V_0$ which correspond to a left most pixel in the first line of the output image $X_0,Y_0$. The backprojection process continues across the first line or row of the image in the x direction by calculating the u,v offset value used to map to the next pixel $(X_0+dx,Y_0)$ in the x,y coordinate space. This is accomplished by supplying dUx and dVx terms from the u and v coefficient memories 72, 74 thereby moving in u,v coordinate space to map consecutive pixels in the x,y coordinate space. The same dUx and dVx terms are applied until the last desired pixel in the line is reached. At that point, a different u,v offset dUy,dVy will be applied that maps the last pixel in the next line (X,Y+dy). This is a move to the next pixel in the y direction. This offset is only applied for one cycle. The process then continues backwards along this line by accessing another pair of u,v coefficients –dUx,–dVx. These coefficients are used until the leftmost pixel in the line is calculated at which point the dUy,dVy coefficient will be accessed again which then maps the leftmost pixel in the next line, or the pixel directly below it. This process continues until the entire image is complete.

Alternately, in forward projection the individual views that created an image are re-generated from the image data. The image data is loaded by individual rows or columns into the view memories 70. Rows of the image are used when forward projecting views within the –45 to +45 and +135 to +225 degree ranges of the x,y image field and columns of the image are used when forward projecting views within the +45 to +135 and +225 to +315 degree ranges of the x,y image field.

Each ASIC 60a–x is provided with table memories 82, including look up tables (Table1, Table2, and Table3) containing transformation data used in the projection process. Backprojection uses Table2, parallel forward projection uses Table2 and Table3, and fan forward projection uses Table1, Table2, and Table3. The table memories 82 are accessed by addresses generated from the u and v coefficient memories 72, 74 accumulated outputs during the projection process. Table1 is addressed by the u coefficient output, and Table2 and Table3 are accessed by the v coefficient output. To reduce the actual number of memory locations required in the ASIC, the tables are stored in the table memories 82 in a condensed form. During a pipeline operation the tables are expanded or linearly interpolated to provide the full set of transformation data.

Incorporated with the tables is an auto-zeroing function that automatically zeros any data points outside a predefined address range. The valid address range remains unchanged while the overall addressable range is double for backprojection operations. All points outside the valid address range are detected and forced to a zero value, thus having no contribution to the operation taking place.

For backprojection, Table2 provides a look up table with an output of D/(D-v) where D represents the fixed distance from the detector 26 to the center of the examination region 14. The value of v, the variable in the equation, represents a point along a v axis in the u,v image field. The v axis extends from the center of the detector 26 through the center of the examination region 14. The u axis of the image field is perpendicular to the v axis. The v=0 and u=0 points are defined to be the center of the examination region 14. These axes rotate in conjunction with the detector's 26 position.

Operation blocks 84 in each ASIC 60a–x process data received from the coefficient accumulators 78 and the table memories 80 to generate the addresses for accessing the view memories 70 and weighting factors for combining with output data from the view memories 70. Multipliers located in the operation blocks 84 are used differently depending upon whether backprojection or forward projection is selected.

For example, when backprojection is selected, a first multiplier generates the weighting factor, which for backprojection is the square of the Table2 output (i.e. $(D/(D-v))^2$), to be multiplied by the view memory data in a projection accumulator (described later herein). The view memory address is generated by using an adder to sum a second multiplier output, which for backprojection is the product of the Table2 output and u (i. e. $(D/(D-v))*u$), and an offset register (described later herein).

On the other hand, in forward projection, the output of the first multiplier (which output is different from that for backprojection) is also employed in the view memory address generation by adding it to the sum of the second multiplier (which output is different from that for backprojection) and the offset register. Therefore, to accommodate both, the output of the first multiplier is input into the adder in both cases, but when backprojection is selected, this input value is zeroed. In this manner, when backprojection is selected, the view memory address is the sum of the second multiplier and the offset register, and for forward projection, this value will also have the first multiplier output added therein.

The offset register is a programmable register that is programmed with the address of the center point of the view memory 70. This value is calculated the same whether performing back projection or forward projection operations. The address loaded into the offset represents the exact center of the data that was received by the ASIC, the address loaded into the offset register should point to this same data point in the interpolated address range. For the ASIC, this center address is different whether cubic spline 76 is enabled or disabled, since it will effect how many interpolated points can be addressed. The offset register is calculated, in one of two manners depending on whether or not the cubic spline 76 is enabled, according to the following equations: offset= (INTP×(N–1))/2 if the cubic spline 76 is enabled, and offset=INTP×(N–1) if the cubic spline 76 is not enabled; where INTP equals 8 if the view memory is linearly interpolated, INTP equals 1 if view memory is not linearly interpolated, and N equals the number of 16-bit data points received by the ASIC.

Each ASIC 60a–x includes a projection accumulator 90 where the ASIC's two pipeline contributions are added together. The projection accumulator 90 multiplies the data from the view memory 70 which is addressed by the operation block 84 times the weighting factor generated by the operation block 84. The ASIC accumulates its two pipelines' contributions, sums these with the previous contributions from previous ASICS, then passes this value to the next ASIC.

The ASICs 60a–x also include an output barrel shifter 92 following the addition of the ASIC's two pipeline contributions with previous pipeline contributions. The pipeline contributions are ultimately accumulated in the output memory (described later herein) which is 32-bits wide, but the output image buffer memory (described later herein) is a 16-bit memory. Therefore, the output barrel shifter is used to shift the 32-bit final accumulated result to select the correct 16-bits of that result that are written into the output buffer memory. The output barrel shifter is programmable depending on the type of scan being performed. Each ASIC 60a–x will contain an output barrel shifter, but only the last ASIC whose output will be written into the output buffer memory will actually use this output barrel shifter. That is to say, only the last ASIC's output buffer memory data lines are physically connected to the output buffer memory. All other ASICs output buffer memory data lines are unused.

Output memory 100 is used to store the pipeline's output data results. There are two banks (Bank0 and Bank1) of output memory 100 that are used during pipeline operations. A single bank of output buffer memory 110, used to store the final pipeline results, is only written to when enabled.

In a preferred embodiment, both the output memory 100 and the output buffer memory 110 are contained on a DIMM daughtercard 120 using a total of five synchronous dynamic random access memory (SDRAM) devices, organized as 512K×16×2. The DIMM daughtercard 120 is a removable assembly mating with a 200-pin DIMM connector. The output memory 100 and output buffer memory 110 consist of several banks of memory implemented using 1M×16 bit SDRAM devices that are internally organized as two banks, or as 512K×16×2 bank devices. The two internal banks allow operation continuously on large amounts of data at high speeds. Two such SDRAM devices are used for each output memory bank (Bank0 and Bank1) to achieve a 1M×32 memory. The two banks of output memory 100, Bank0 and Bank1, are both configured as 1M×32 bits and the one output buffer memory 110 is configured as 1M×16. The output buffer memory 110 uses a single SDRAM device to achieve the 1M×16 memory.

The two output memory banks (Bank0 and Bank1) are used during pipeline operations to accumulate the 32-bit pipeline results by reading the previous updated value out of one bank, adding the new pipeline contribution to it, and writing the new updated data value into the other bank. With each pipeline cycle, the output memory will alternate which bank is use to read out the most current data value and which bank is used write the new updated data value into. Both banks of output memory 100 are simultaneously used during a pipeline operation. Each time the pipeline is started all valid data points (which depends on the size of the image for backprojection and the size of the output view for forward projection) in the output memory 100 are updated.

More specifically, the output memory 100 is used during pipeline operations to store the values of a projection operation. Each clock cycle of a pipeline operation causes a read-modify-write cycle be completed to the output memory 100. To achieve this, two banks of memory are used, one to perform a read and one to execute a write. Once the pipeline finishes a complete output memory update, logic will automatically switch which memory bank will be used for the read and the write operations.

The other area of memory, output buffer memory 110, is used to store a 16-bit version of data that is used for viewing. The final output data for both backprojection and forward projection is a 16-bit value, therefore, the output buffer memory 110 is 16 bits wide. The output buffer memory 110 is only written to when enabled, typically, during the last update cycle of a complete backprojection or forward projection operation. This memory can then be accessed via the PCI bus 50 while other pipeline operations are using the two output memory banks (Bank0 and Bank1) . The output buffer memory 110 retains its original data for as long as it is not enable again during a pipeline operation (i.e. until the next completed backprojection or forward projection). The single bank output buffer memory 110 is used to store only the last updated data value resulting from the completion of multiple pipeline operations. Pipeline data is written into this memory when a buffer write software bit is set. System software is responsible for enabling when pipeline data will be written into the output buffer memory 110. A PCI read or write to the output buffer memory 110 can occur during a pipeline operation as long as the buffer write enable bit is disabled. This allows the system to set up and begin the pipeline operation, whose results are being accumulated in the banks of the output memory 100, then read out the buffer memory data results from the previous projection without causing pipelines to stop.

Pipeline operations, once initiated, access both banks (Bank0 and Bank1) of the SDRAM output memory 100 on every 66 MHz clock cycle for the entire period that the pipeline is active. A backprojection or forward projection operation requires that all views or image data, respectively, be loaded into the pipelines' memory. Only as many views or images can be loaded as there are number of pipelines, then the pipeline cycle is started. Typically, multiple loads of pipelines' memories occur and the pipelines are started multiple times to complete a backprojection or forward projection operation. The final ASIC will accumulate multiple operations by reading back the previous output results and updating them with the final result of the current cycle. The output of the first cycle is selected as to which output memory bank (Bank0 or Bank1) to write the first cycle's results into. The output memory bank not selected is used as the initial data that will be updated by adding the first output results to it. That is to say, the final ASIC's projection accumulator 90 accumulates the unselected bank's data with its other accumulated results. After selection, the system is controlled through the hardware to correctly direct which bank of output memory will be used for future results. The final ASIC uses the selected bank to write the ASIC's results into. The next cycle will read the data out of the same bank of memory that the previous cycle wrote its updated results into and use this as the data to be updated by accumulating the current cycle's data therewith. The new updated results then get written into the opposite bank of memory. The bank of memory that contains the previous updated data and bank of memory that will have the new updated value written into will alternate each time a cycle completes and another is started. This switching of memory banks is performed by the hardware with no software control required other than to program which bank is used to write out the first pipeline cycle's results.

For calculations performed in the ASICs 60*a–x,* data values are rounded by a method termed divergent rounding. Factional values are rounded to their nearest integer value. However, where a fractional value is equidistant from two integer values (i.e. the fractional portion is 0.5), this method rounds toward positive infinity for positive values, and toward negative infinity for negative values. This method tends to give identical results if rounding before or after an arithmetic operation. For example, take addition as the operation to be performed on the numbers +1.5 and −1.5. Simply added, these two numbers together result in zero. If both are rounded to either positive infinity or negative infinity prior to the operation, the numbers are +2 and −1, and +1 and −2, respectively, and the results of the addition operation are +1 and −1 respectively. The results of +1 and −1 both differ from the ungrounded result of zero. As can be seen from these examples, an undesirable positive or negative bias is introduced into the result of an arithmetic operation. When the divergent rounding technique is used, +1.5 and −1.5 are rounded to +2 and −2, respectively, and when sum together give us the desired pre-rounding result of zero.

For calculations performed in the ASICs 60*a–x,* rounding of the values that represent addresses are rounded in a different manner to produce, after rounding, an equal number of points around the zero value. If the rounding technique for data values discussed above, termed divergent rounding, is used for address rounding, there would be a non-symmetric rounding pattern around zero. Therefore, for address rounding, either rounding in the direction of positive or negative infinity is used for all values, both positive and negative. Digitally, rounding toward negative infinity for fractional values is implemented by truncating the entire remainder. That is, all fractional values are rounded to the next closest integer value toward negative infinity.

The invention has been described with reference to the preferred embodiments. Obviously, modifications and alterations will occur to others upon a reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A forward projector/backprojector for a CT scanner comprising:
    a first interface which loads data onto and off of the forward projector/backprojector;
    a central processing unit which controls data flow;
    an array of application specific integrated circuits, each application specific integrated circuit having;
        two pipelines along which data is subjected to pipeline operations including one of a forward projection algorithm and a backprojection algorithm; and
        double-buffered memories having opposing sets of banks for storing data subject to the pipeline operations, the double-buffered memories being arranged such that while data is loaded into a set of banks of the double-buffered memories data in its opposing set of banks is subject to pipeline operations;
    a dual in-line memory module daughtercard including thereon;
        two output memory banks employed during pipeline operations, wherein for consecutive pipeline operations the two output memory banks are alternatingly employed such that one of the two output memory banks has previously written results read therefrom for updating by the pipeline operations while the other of the two output memory banks has updated pipeline results written thereto; and,
        an output buffer memory bank which stores final updated pipeline results after completion of consecutive pipeline operations; and,
    a peripheral component interconnect bus which transfers data between the central processing unit, the first interface, the dual in-line memory module daughtercard, and the array of application specific integrated circuits.

2. The forward projector/backprojector of claim 1, wherein the double-buffered memories of the application specific integrated circuits are manually toggled such that on consecutive pipeline cycles each set of banks of the double-buffered memories is alternately loaded and subject to pipeline operations.

3. The forward projector/backprojector of claim 1, wherein the double-buffered memories of the application specific integrated circuits are automatically toggled such that on consecutive pipeline cycles each set of banks of the double-buffered memories is alternately loaded and subject to pipeline operations.

4. The forward projector/backprojector of claim 3, wherein each application specific integrated circuit automatically directs data being loaded, to the double-buffered memories set of banks which is designated for loading regardless of which set of banks is addressed.

5. The forward projector/backprojector of claim 1, wherein each application specific integrated circuit further includes:
    a selectively enabled circuit for performing a cubic spline interpolation of input data prior to loading into one of the double-buffered memories.

6. The forward projector/backprojector of claim 1, wherein each application specific integrated circuit further includes:
    a table memory which stores look-up tables having transformation data used in the pipeline operations, wherein the transformation data from the look-up tables is arranged such that it is linearly interpolated during pipeline operations.

7. The forward projector/backprojector of claim 6, wherein the table memory of each application specific integrated circuit further includes:
    an overall range of addressable locations, the overall range of addressable locations including a predefined range of valid address locations, wherein the table memory is arranged such that addressing an addressable location of the overall range of addressable locations outside the predefined range of valid address locations returns a zero value.

8. The forward projector/backprojector of claim 1, wherein each application specific integrated circuit further includes:
    address round circuitry which rounds all fractional address values toward a closest integer value in one of a positive infinity direction and a negative infinity direction; and,
    data value rounding circuitry which rounds positive fractional data values that are equidistant from two integer values toward positive infinity, negative fractional data values that are equidistant from two integer values toward negative infinity, and all other fractional data values towards a closest integer value.

9. A method of forward projection/backprojection, comprising:
    (a) loading data onto a projection processor;
    (b) directing data flow on the projection processor over a bus;
    (c) successively loading data from the bus into an array of application specific integrated circuits while concurrently performing successive pipeline operations including one of a forward projection and a backprojection with the data previously loaded into the array of application specific integrated circuits;
    (d) accumulating the results from the pipeline operations; and,
    (e) consecutively updating the accumulated results from the pipeline operations.

10. The method of claim 9, further comprising:
    (f) storing a final result from the pipeline operations separately from the accumulating results; and,
    (g) accessing the final results without interrupting the updating of the accumulated results.

11. The method of claim 10, wherein step (c) further comprises:
    selectively subjecting at least a portion of the data to cubic spline interpolation as the data from the bus is being loaded into the array of application specific grated circuits.

12. The method of claim 11, wherein step (c) further comprises:

generating address and data values while performing successive pipeline operations;

rounding all fractional address values toward a closest integer value in one of a positive infinity direction and a negative infinity direction; and, rounding positive fractional data values that are equidistant from two integer values toward positive infinity, negative fractional data values that are equidistant from two integer values toward negative infinity, and all other fractional data values towards a closest integer value.

13. The method of claim 10, wherein step (e) further comprises:

retrieving previously stored accumulated results from one of two memory banks;

combining the previously stored accumulated results with current accumulated results;

storing the combination of the previously stored accumulated results and the current accumulated results in one of the two memory banks not used for retrieving the previously stored accumulated results from; and, alternating which one of the two banks of memory is use for retrieving previously stored accumulated results from.

14. The method of claim 9, wherein step (c) further comprises:

generating look up tables via linear interpolation of table memories while performing successive pipeline operations;

arranging at least one of the look-up tables with an overall range of addresses at least twice the size of a predefined range of valid addresses; and, setting values corresponding to addresses in the overall range of addresses that are outside the predefined range of addresses to zero.

15. A forward projection/backprojection processor in CT scanner having a stationary gantry portion which defines an examination region, a rotating gantry portion mounted on the stationary gantry portion for rotation about the examination region, an x-ray source arranged on the rotating gantry portion such that a beam of radiation passes through the examination region as the rotating gantry portion rotates, a collimator and shutter assembly for forming the beam of radiation into a thin fan-shaped beam and selectively gating the beam on and off, an array of radiation detectors arranged to receive the x-ray radiation emitted from the x-ray source after it has traversed the examination region, an array processor for filtering and convolving sampled data from the detectors, and a human viewable display for displaying view data from forward projection operations and reconstructed images from backprojection operations, the forward projection/backprojection processor comprising:

a first interface which loads input data from the array processor into the forward projection/backprojection processor and passes output data from the forward projection/backprojection processor to the human viewable display;

a central processing unit which controls data flow;

an array of application specific integrated circuits, each application specific integrated circuit having;

two pipelines along which data is subjected to pipeline operations including one of a forward projection algorithm and a backprojection algorithm; and, double-buffered memories having opposing sets of banks for storing data subject to the pipeline operations, the double-buffered memories being arranged such that while data is loaded into a set of banks of the double-buffered memories data in its opposing set of banks is subject to pipeline operations;

two output memory banks employed during pipeline operations, wherein for consecutive pipeline operations the two output memory banks are alternatingly employed such that one of the two output memory banks has previously written results read therefrom for updating by the pipeline operations while the other of the two output memory banks has updated pipeline results written thereto; and, an output buffer memory bank which stores final updated pipeline results after completion of consecutive pipeline operations.

16. The forward projection/backprojection processor of claim 15, further comprising:

circuitry arranged on each application specific integrated circuit such that the double-buffered memories of the application specific integrated circuits are automatically toggled on consecutive pipeline cycles so that each set of banks of the double-buffered memories is alternately loaded and subject to pipeline operations, wherein data that is being loaded is automatically directed by the circuitry to the double-buffered memories set of banks which is designated for loading regardless of which set of banks is addressed.

17. The forward projection/backprojection processor of claim 16, wherein each application specific integrated circuit further includes:

a selectively enabled circuit for performing a cubic spline interpolation of input data prior to loading into one of the double-buffered memories.

18. The forward projection/backprojection processor of claim 17, wherein each application specific integrated circuit further includes:

a table memory which stores look up tables having transformation data used in the pipeline operations, wherein the transformation data from the look up tables is arranged such that it is linearly interpolated during pipeline operations; and, the look up tables have an overall range of addressable locations, the overall range of addressable locations including a predefined range of valid address locations, wherein the look up tables are arranged such that addressing an addressable location of the overall range of addressable locations outside the predefined range of valid address locations returns a zero value.

* * * * *